United States Patent [19]
Subramanian et al.

[11] Patent Number: 5,316,991
[45] Date of Patent: May 31, 1994

[54] EXHAUST TREATING SYSTEM FOR LEAN-BURN CNG ENGINE

[75] Inventors: Somasundaram Subramanian, Melvindale; Robert J. Kudla, Warren; Mohinder S. Chattha, Northville, all of Mich.

[73] Assignee: Ford Motor Company, Dearborn, Mich.

[21] Appl. No.: 789,707

[22] Filed: Nov. 8, 1991

[51] Int. Cl.$^5$ .............................................. B01J 29/06
[52] U.S. Cl. ........................................ 502/65; 502/66
[58] Field of Search ................. 502/65, 66, 71, 74, 502/303; 423/213.5, 245.3, 247

[56] References Cited

U.S. PATENT DOCUMENTS 4,170,571 10/1979 Ritscher ........................... 423/245.3
4,465,654 8/1984 Faschingbauer ..................... 423/247

OTHER PUBLICATIONS

"Highly Selective Reduction of Nitrogen Oxides with Hydrocarbons over H-form Zeolite Catalysts in Oxygen-Rich Atmospheres", Hamada et al., Applied Catalysis, 64, (1990), L1–L4.

"Influence of Sulfur Dioxide on Catalystic Removal of Nitric Oxide over Copper Ion-exchanged ZSM-5 Zeolite", Iwamoto et al., Applied Catalysis, 69, (1991) L15–L19.

Stoichiometric Catalytic Decomposition of Nitric Oxide over Cu–ZSM-5 Catalysts, Li et al., Journal of Physical Chemistry, vol. 94, p. 6145, 1990.

*Primary Examiner*—Carl F. Dees
*Attorney, Agent, or Firm*—Joseph W. Malleck; Roger L. May

[57] ABSTRACT

A three-way catalyst system for efficiently converting the exhaust gas from a CNG-fueled engine when operated under lean conditions at a redox ratio of 0.02–0.9, the system comprising a first stage catalyst comprising a transition metal-containing zeolite; means for injecting a hydrocarbon into said exhaust gas prior to entry of said exhaust gas into said first stage catalyst, said hydrocarbon having a greater affinity than $CH_4$ in its ability to react with NO; and a second stage catalyst for treating the effluent from said first stage catalyst and comprising a high surface area alumina impregnated with discontinuous $La_2O_3$ and palladium.

The invention also comprehends a method of treating exhaust gases from a lean-burn CNG-fueled engine, operating at a redox ratio of 0.02–0.9; exposing such exhaust gases to a first stage catalyst consisting of copper-ZSM5 zeolite having at least 3% by weight ion-exchange copper; injecting a fast-acting hydrocarbon into said exhaust gas prior to entry of the exhaust gas into said first stage catalyst, the hydrocarbon having a greater affinity than $CH_4$ in its ability to react with NO; and exposing the effluent from the first stage catalyst to a second stage catalyst comprising palladium supported on alumina containing discontinuous $La_2O_3$.

7 Claims, 6 Drawing Sheets

EXHAUST TREATING SYSTEM FOR LEAN-BURN CNG ENGINE

BACKGROUND OF THE INVENTION

1. Technical Field

This invention relates to the technology of treating exhaust from a compressed natural gas (CNG) fueled engine to remove its noxious content, and more particularly to the treatment of exhaust from a CNG engine controlled to operate under lean-burn combustion conditions.

In copending U.S. Ser. No. 07/772,318 filed Oct. 7, 1991, (U.S. Pat. No. 5,208,204) authored by some of the authors of this invention and commonly assigned to the assignee herein, a catalyst is disclosed which enhances the three-way conversion capability of a modified $Pd/Al_2O_3$ catalyst in treating the exhaust gas of a compressed natural gas-fueled engine, provided the engine is limited to being operated slightly rich of stoichiometry, i.e., redox ratio (R) of 1–1.2 (R being the ratio of reducing components to oxidizing components in the exhaust gas). Untreated exhaust from a CNG-fueled engine, operated under rich conditions, contains a high content of CO (about 2000–2250 ppm), a high content of $NO_x$ (at least about 450 ppm), and a methane content at least about 300 ppm. Although the enhancement achieved by this disclosure over the prior art is significant, fuel-rich operation affects the fuel economy of the CNG-fueled engine and therefore can be undesirable. At stoichiometry or below stoichiometry (i.e., lean region), the conversion capability of such a catalyst drops dramatically.

If the exhaust gas is pretreated by use of a copper-exchanged zeolite, prior to entering the three-way/CNG catalyst described above, the engine can be operated at stoichiometry to achieve conversion efficiency in excess of 80% for all of CO, NO, and $CH_4$ [see copending U.S. Ser. No. 07/789,558 filed Nov. 8, 1991 U.S. Pat. No. 5,179,053 (91-270), authored by some of the authors of this invention, and commonly assigned to the assignee herein]. However, if this combination is used to treat the exhaust from a fuel-lean operated CNG engine, the conversion capability drops again dramatically. Moreover, expensive electronic controls are required to regulate the engine operation at stoichiometry.

2. Discussion of the Prior Art

Copper-exchanged zeolites have been used to cleanse lean-burn type exhaust, but only from exhaust gases simulating the exhaust from a conventional gasoline-fueled engine. Such gasoline engine exhaust contains very high contents of fast-burning hydrocarbons, a representative of which is propylene (at about 1000 ppm), high contents of slow-burning hydrocarbons, a representative of which is propane (at about 500 ppm), very high contents of NO (about 1000 ppm), and very high content of CO (at about 15,000 ppm), with an absence of methane. A copper-exchanged zeolite catalyst would not be effective, by itself, in treating the total exhaust from a CNG-fueled engine operating under lean conditions, since such an exhaust would contain considerably lower amounts of NO and CO but significant amounts of methane. The conversion efficiency would be well below 80% (see Li et al, "Stoichiometric Catalytic Decomposition of Nitric Oxide Over Cu-ZSM-5 Catalyst", *Journal of Physical Chemistry*, Vol. 94, p. 6145, 1990; Iwamoto et al, "Influence of $SO_2$ On Catalytic Removal of NO Over Copper Ion-Exchange ZSM-5 Zeolite", *Applied Catalysis*, Vol. 69, L 15–L 19, 1991; and Hamada et al, "Highly Selective Reduction of Nitrogen Oxides With Hydrocarbons Over H-Form Zeolite Catalysts In Oxygen-Rich Atmospheres", *Applied Catalysis*, Vol. 64, L 1–L 4, 1990).

What is needed is a catalyst system that economically and durably converts CO, $NO_x$, and $CH_4$ present in the exhaust of a lean-burn CNG-fueled engine.

SUMMARY OF THE INVENTION

The invention artificially injects a fast-burning hydrocarbon into the exhaust gas of a CNG-fueled engine (such hydrocarbons may naturally occur in the exhaust gas of gasoline-powered engines), such injection modifying the content of the exhaust gas of a lean-burn CNG engine prior to entering into a zeolite-type first stage catalyst. The effluent from such first stage catalyst contains an exhaust gas that is critically changed in character prior to entering the second or downstream catalyst stage, the NO and CO having been considerably reduced and oxidized respectively allowing the second stage catalyst to focus primarily upon $CH_4$ conversion.

More particularly, the invention is a three-way catalyst system for efficiently converting the exhaust gas from a CNG-fueled engine when operated at lean conditions a redox ratio, $R = 0.02–0.9$, the system comprising: (a) a first stage ca comprising a transition metal-containing zeolite; (b) means for injecting a hydrocarbon into said exhaust gas prior to entry of said exhaust gas into said first stage catalyst, said hydrocarbon having a greater affinity than $CH_4$ for reacting with NO; and (c) a second stage catalyst for treating the effluent from said first stage catalyst and comprising a high surface area alumina impregnated with lanthana and palladium.

The invention also comprehends a method of treating exhaust gases from a CNG-fueled engine, the method comprising: (a) operating the engine under lean-burn conditions with redox ratio of 0.02–0.9; (b) exposing such exhaust gases to a first stage catalyst consisting of copper-ZSM5 zeolite having at least 3% by weight ion-exchange copper; (c) injecting a fast-burning hydrocarbon into said exhaust gas Prior to entry of the exhaust gas into said first stage catalyst, the hydrocarbon having a greater affinity than $CH_4$ for combining with NO; and (d) exposing the effluent from said first stage catalyst to a second stage catalyst comprising a gamma alumina support impregnated with palladium and other catalytic activity and durability enhancing oxides.

DETAILED DESCRIPTION AND BEST MODE

Figure 1:
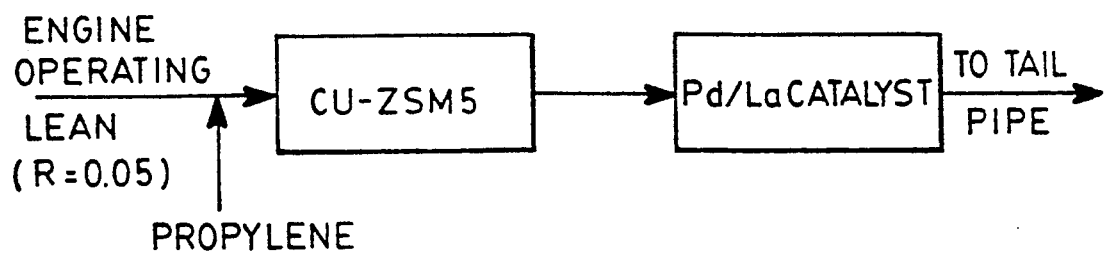
FIG. 1 is a block diagram illustrating the preferred form of elements of the catalytic system of this invention.

In the catalytic system of this invention as shown in FIG. 1, the first stage comprises a zeolite-based catalyst, preferably copper-ZSM5, followed by a second stage comprised of palladium supported on $La_2O_3/Al_2O_3$ composite oxide where $La_2O_3$a is preset as a discontinuous phase.

Zeolite Catalyst

The catalyst contains a transition metal-containing zeolite; the zeolite is desirably a high silica zeolite having a $SiO_2/Al_2O_3$ molar ratio that exceeds 10, preferably up to about 60 (see U.S. Pat. No. 4,297,328, which is expressly incorporated herein by reference, for teaching use of other class of zeolites.

The transition metal, such as copper, is provided into the zeolite by ion-exchange. The transition metal may be selected from the group consisting of Cu, Co, Ni, Cr, Fe, Mn, Ag, Zn, Ca, and compatible mixtures thereof. Generally, a sodium, hydrogen, or ammonium zeolite is contacted by an aqueous solution of another cation, in this case an aqueous solution of soluble copper compound such as copper acetate, wherein replacement of the sodium, hydrogen, or ammonium ion by copper ion takes place. It is advantageous to provide as much transition metal ion in the zeolite as possible since the amount of transition metal present in the zeolite is directly related to the catalytic activity of the first stage. Preferably, this is at least 3% by weight of zeolite, up to a maximum determined by the $SiO_2/Al_2O_3$ ratio. After replacing the sodium, hydrogen, or ammonium ion with the metal ion, the zeolite is generally washed to remove excess surface transition metal compound. It is not necessary to do so, however.

The first stage catalyst may also contain a transition metal-containing oxide, but such transition metal should be of the same type as that used in the ion exchange for the zeolite. Preferably, this transition metal is copper and copper is particularly preferred because it is active at lower temperatures. Preferably, the oxide is zirconia and the metal it contains is copper, although other oxides such as titania, silica, and very minor proportions of lanthana aluminate may be employed. One method of making a copper-containing zirconia comprises soaking a quantity of zirconia, in the form of a fine powder, repeatedly, if desired, in a solution of copper compound. The copper impregnated $ZrO_2$ is subsequently dried and calcined at temperatures between 300°–600° C., often at about 450° C. The copper compound should be one that is soluble or that can be dispersed in a liquid, that is, those which are soluble in an aqueous solution or which can be solublized therein, e.g., with the aid of an acid or base. Exemplary of such copper compounds are copper salts like copper nitrate and copper sulfate; organo-copper compounds like carboxylates of copper, copper acetate, and copper-cupric amines; organo-complexes of copper like diamine copper acetate; tetraamine copper sulfate, and copper acetylacetonate. Soluble compounds, exemplary of other transition metal compounds include cobalt acetate, nickel acetate, ferric chloride, chromic nitrate, and manganese acetate.

The saturated zirconia is then dried and calcined in air, the copper compound decomposing to form copper oxide. Preferably, copper is present in an amount between 0.1-20% by weight as CuO. Each of the copper-containing oxide and the copper-containing zeolite may be ground to a fine powder and mixed together to form a slurry. The slurry is then deposited on a substrate such as a metal or ceramic honeycomb. While it is preferable to make the catalyst this way, it may also be made by layering one material over another.

CNG/Three-Way Catalyst

The second stage catalyst functions to cleanse the exhaust effluent from the first stage when operated under lean-burn engine exhaust conditions. The catalyst comprises a high surface area gamma alumina support which is impregnated with 0.5-20% $La_2O_3$ or its equivalent. Palladium in an amount 0.2-30% by weight of the second stage catalyst is impregnated on the $La_2O_3/Al_2O_3$ support. The operation of such a second stage will be described with that optimum catalyst in place. The support is preferably alumina of the gamma form rather than of the delta or alpha forms because the gamma form provides, among other factors, a greater surface area. With gamma alumina, the surface area will be significantly higher and be in the range of 50-400 $m^2/gm$. The particle size of the gamma alumina should be preferably less than 200 angstroms and the monolith carrier should have a cell size in the range of 100-600 cells per square inch. Gamma alumina may also be modified with oxides of base, rare earth, and alkaline metal such as barium, cerium, titanium, and nickel to promote thermal stability, catalytic activity, durability, and washcoat adhesion.

The lanthana impregnation is carried out to load the support with lanthana in the weight range of 0.5-20%. If lanthana is added in an amount less than such range, then the beneficial effect of increase in activity due to lanthana addition is not observed. If lanthana exceeds such range, then the support surface area decreases and no additional benefit is derived. It is important that the lanthana be applied in a discontinuous mode to the support so that both the palladium and lanthana are simultaneously exposed to the exhaust gas. Elements that are partial equivalents to the function of lanthana for purposes of this invention may include tungsten oxide and molybdenum oxide. The conversion efficiency enhancement will be less with either of the latter oxides; therefore, it is desirable if only a portion of $La_2O_3$ is replaced by $WO_3$ or $MoO_3$.

Palladium is impregnated in a manner to provide the presence of large crystalline particles, preferably in the particle size range of 20-1000 angstroms. Hence, the Pd weight loading is in the range of 0.2-30%. With palladium weight loadings below 0.2%, there will be an insufficient catalysis effect an therefore not promote the objects of this invention. If the palladium loading is in excess of 30%, the palladium surface area decreases and no additional benefit from palladium addition is derived.

Other elements that may be present in the second stage catalyst may include elements that avoid retention of water for improving the long-life stability of catalysts. This may include elements such as tungsten oxide (incorporated by using ammonium meta tungstate during the impregnation process) or chromium oxide, both of which tend to prevent oxidation of palladium by reducing the mobility of water and thereby keeping it away from the palladium.

Performance

Samples of the catalyst system of this invention were prepared. The first stage catalyst was formed by using a commercially available ZSM5 zeolite catalyst and contacting it with an aqueous solution of copper nitrate (under controlled pH) to exchange 5% by weight of copper. The resulting material was dried at 120° C. The 5% Cu/ZSM5 powder was suspended in an aqueous slurry and deposited on a monolithic cordierite substrate. The resulting material was dried and calcined at 450° C. to form the 5% Cu/ZSM5 catalyst.

The second stage catalyst was prepared by using a washcoated monolithic cordierite substrate containing predominantly gamma alumina and relatively small amounts of alpha alumina, nickel oxide, cerium oxide, lanthana, and titania; the substrate was dipped in an aqueous solution of lanthanum nitrate to discontinuously deposit 10% lanthana by weight of the washcoat system. The substrate was dried at 120° C. and calcined at 600° C. The substrate was then dipped in an aqueous solution of palladium chloride containing 4% by volume $HNO_3$ to deposit 1% palladium by weight of the washcoat system. The precursor was dried at 120° C. and calcined at 600° C. to form a three-way catalyst.

The catalyst system was first analyzed in a flow reactor under conditions used to simulate CNG vehicle exhaust without the injection of any HC reductant: 300 ppm $CH_4$, 2250 ppm CO, 750 ppm $H_2$, and 425 ppm NO at 550° C. The $O_2$ concentration was varied and $N_2$ was used as the carrier gas.

Figure 2:
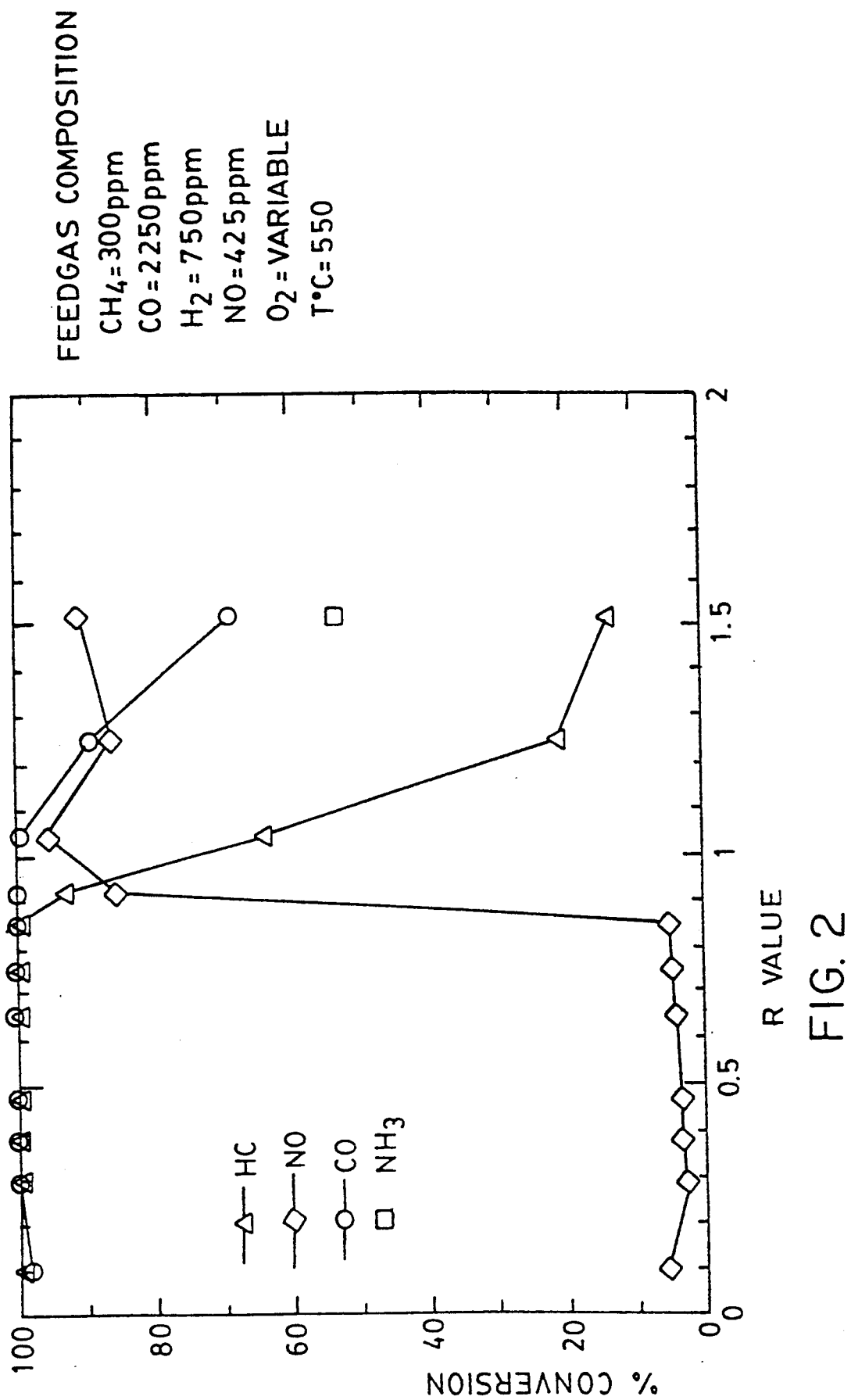
FIG. 2 is a graphical illustration of percent conversion efficiency as a function of R value for a catalyst system that has the first stage and second stage catalyst of this invention but is operated without the injection of a fast-burning hydrocarbon such as propylene prior to entry of the exhaust gas into the first stage.
Figure 3:
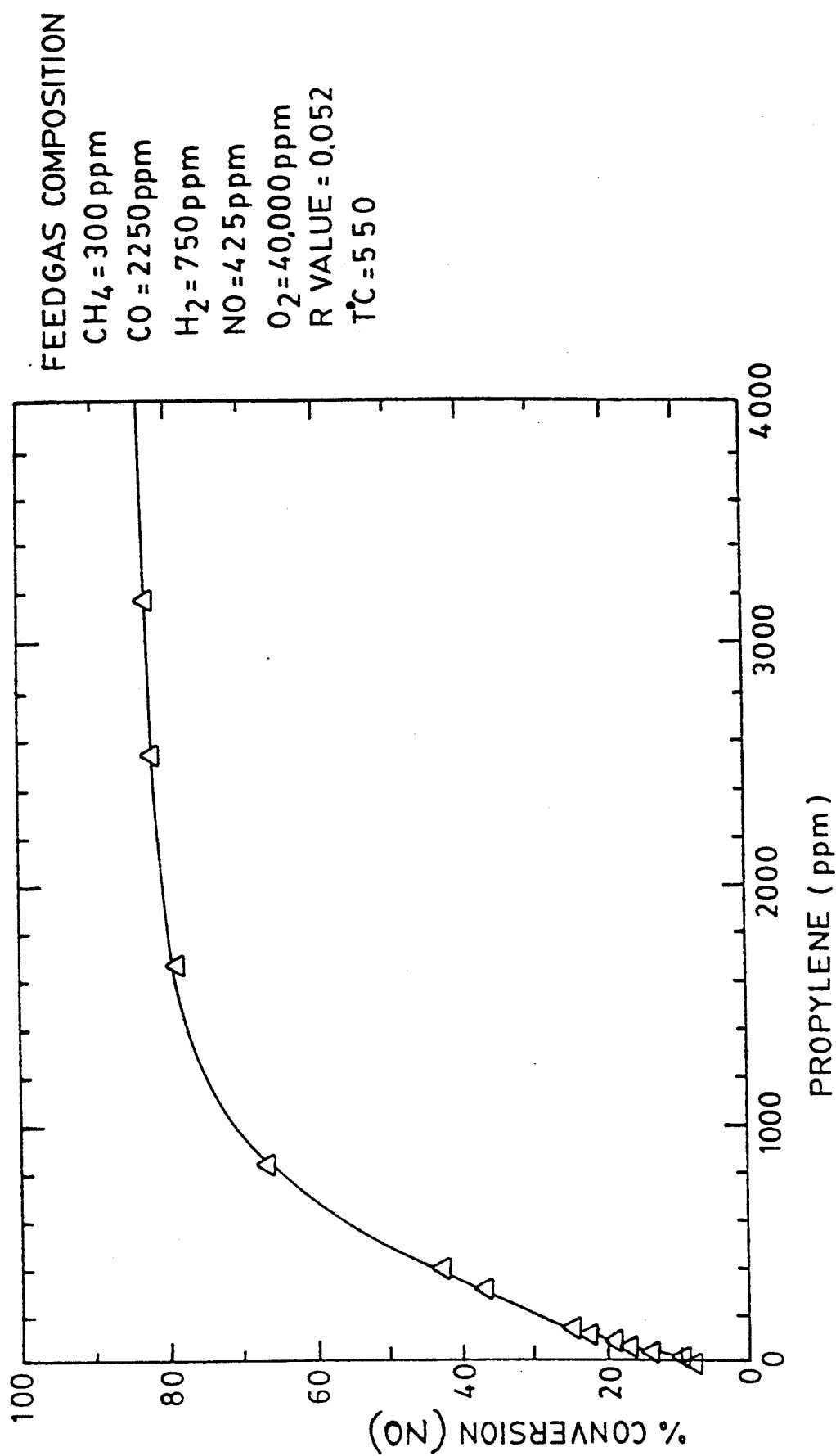
FIG. 3 is a graphical illustration of percent conversion efficiency of NO as a function of the injected propylene concentration.
Figure 4:
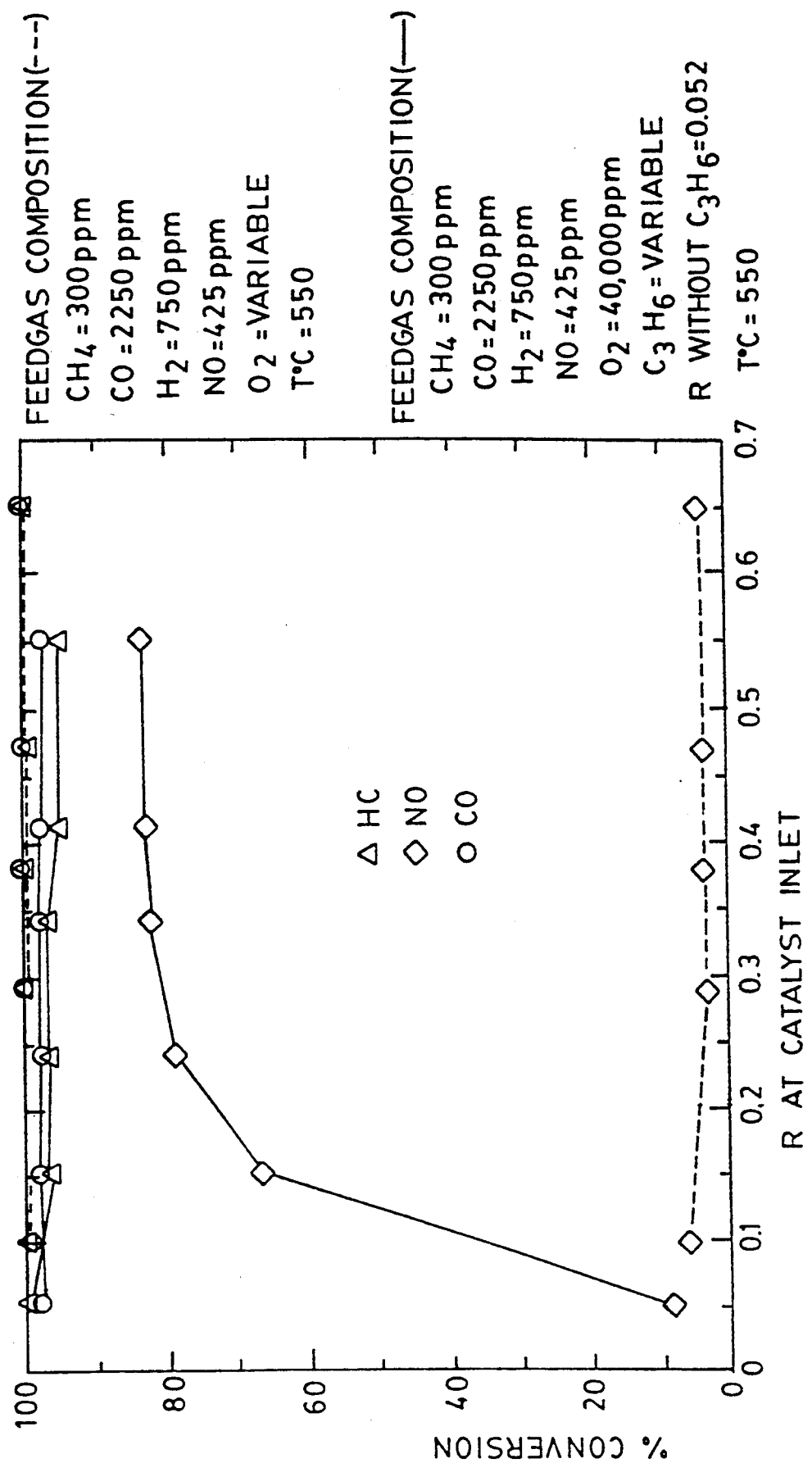
FIG. 4 is a graphical illustration of percent conversion efficiency for the system of this invention as a function of the redox ratio at the inlet of the first stage catalyst.
Figure 6:
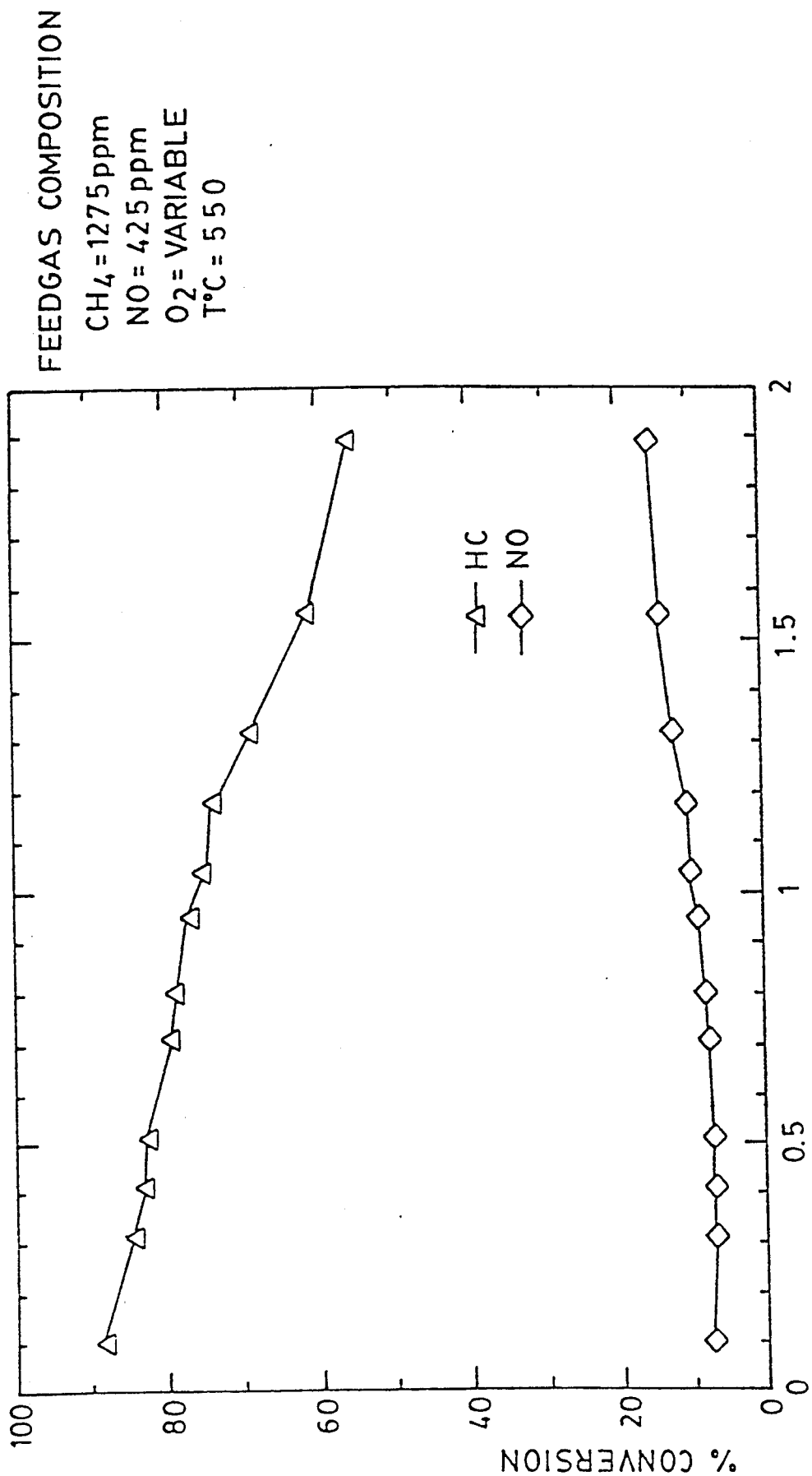
FIG. 6 is a graphical illustration of percent conversion efficiency for $CH_4$ and NO as a function of R when the CNG exhaust (no $C_3H_6$ added) is only exposed to the first stage catalyst.

The results, as exhibited in FIG. 2, show that the NO conversion efficiency drops to 0% at R values lower than 0.8. Thus, the CNG-fueled engine would have to be operated around the stoichiometric point for efficient removal of the three main constituents without injection of an additional reductant; this is undesirable from a fuel economy standpoint. When varying amounts of propylene reductant are injected into the feed gas fed into such catalyst system, the NO conversion efficiency reaches at least about 80% when 1600 ppm or more of $C_3H_6$ is present, as shown in FIG. 3. The R value of the raw exhaust gas for FIG. 3 test conditions was 0.052; when the proplylene is injected, the R value at the inlet to first stage catalyst will be slightly higher, but this is taken into account in FIG. 4. In FIG. 4, close to 100% conversion efficiency is maintained for CO and $CH_4$ even when $C_3H_6$ is injected as a reductant through the lean combustion region (0.02-0.9 R). But, most importantly, conversion efficiency NO is dramatically increased from below 3% to an excess of 80% in the lean-burn region. Also, all of the added propylene (essentially 100%) is converted to $CO_2$ and water vapor. This is a surprising result because $CH_4$ conversion actually drops with increasing R value in the lean region when exposed to the first stage catalyst only (see FIG. 6); moreover, NO conversion efficiency remains low.

Figure 5:
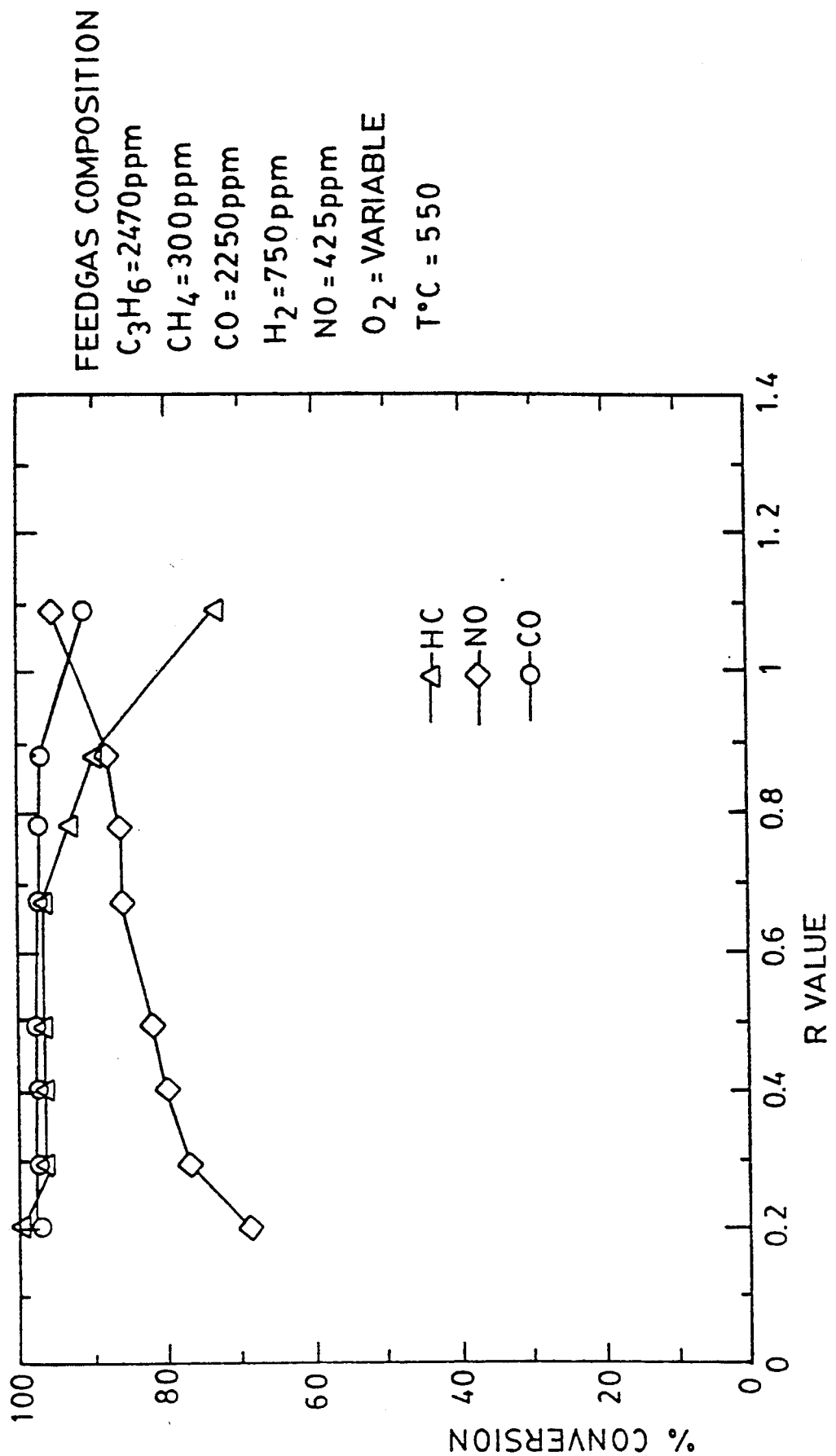
FIG. 5 is a graphical illustration of percent conversion efficiency for the system of this invention as a function of R value when the propylene injection is held constant and oxygen varied.

The effect of varying oxygen concentration is shown in FIG. 5. Here the amount of propylene added was held constant at 2470 ppm and the oxygen concentration was varied. The redox ratio refers to the condition at the inlet of the catalyst (after addition of propylene). The hydrocarbon and carbon monoxide conversions slightly decrease as the amount of oxygen present decreases (increase in redox ratio). The nitric oxide conversion increases with a decrease in the amount of oxygen present.

The addition of propylene increases the nitric oxide conversion in the lean region significantly. Also, propylene is fully converted to carbon dioxide and water vapor. This observation may be explained as follows. The exhaust gas with added propylene flows over the zeolite catalyst first. The reactions that are catalyzed by Cu-ZSM5 include:

$$2C_3H_6 + 18NO \rightarrow 6CO_2 + 6H_2O + 9N_2 \quad (1)$$
$$2C_3H_6 + 9O_2 \rightarrow 6CO_2 + 6H_2O \quad (2)$$
$$CH_4 + 2O_2 \rightarrow CO_2 + 2H_2O \quad (3)$$
$$2CO + O_2 \rightarrow 2CO_2 \quad (4)$$

$C_3H_6$ also reacts with NO, $N_2$, $CO_2$, and $H_2O$, and species obtained by partial oxidation of $C_3H_6$ are obtained as products.

Briefly, the zeolite catalyst allows a fraction of the added propylene to react with nitric oxide; nitrogen, carbon dioxide, and water vapor are among the products obtained. In addition, the zeolite catalyst oxidizes (i) propylene (with oxygen) and methane to carbon dioxide and water vapor, and (ii) carbon monoxide to carbon dioxide. The CNG three-way catalyst placed further from the engine manifold converts the unconverted hydrocarbons (including methane and propylene), oxygenated compounds, and carbon monoxide from the first stage to carbon dioxide and water vapor by reactions (2)-(4). To summarize, removal of nitric oxide is accomplished by its reaction with propylene over the zeolite catalyst. The oxidation of methane, propylene, and carbon monoxide occurs on both catalysts.

Any CNG exhaust system known to date does not provide high nitric oxide conversion in the fuel lean region. These exhaust systems limit the potential of CNG engines by requiring the engines to be calibrated in the fuel-rich region or require that the air/fuel ratio be tightly controlled. The additional of hydrocarbons, such as propylene, ethylene, or propane, results in high conversions for all three constituents, nitric oxide, methane, and carbon monoxide, under fuel-lean conditions. A lean-burn CNG engine can effectively utilize the high "octane" rating of the CNG fuel and thereby offer superior engine performance in terms of fuel economy and power output considerations.

TABLE I

| CNG | | GASOLINE | |
|---|---|---|---|
| $CH_4$ | 300 ppm | $C_3H_8$ | 500 ppm |
| | | $C_3H_6$ | 1,000 ppm |
| NO | 425 ppm | NO | 1,000 ppm |
| CO | 2250 ppm | CO | 15,000 ppm |
| $H_2$/CO | 0.5-0.33 | $H_2$/CO | 0.33 |
| $SO_2$ | up to 5 ppm | $SO_2$ | 20 ppm |

We claim:

1. A three-way catalyst system for efficiently converting the exhaust gas from a CNG-fueled internal combustion engine when operated at lean conditions defined by a redox ratio of 0.02-0.9, the system comprising:
   (a) a first stage catalyst comprising a transition metal-containing zeolite;
   (b) means for injecting a fast-burning hydrocarbon into said exhaust prior to entry of said exhaust gas into said first stage catalyst, said hydrocarbon having a greater affinity than $CH_4$ in its ability to react with NO; and (c) a second stage catalyst for treating the effluent from said first stage catalyst and comprising alumina impregnated with palladium.

2. The system as in claim 1, in which said second stage catalyst comprises also $La_2O_3$.

3. The system as in claim 1, in which said second stage catalyst comprises gamma alumina impregnated with 0.5-20% $La_2O_3$ and 0.2-30% palladium.

4. The system as in claim 2, in which said lanthana is discontinuously coated on said alumina.

5. The system as in claim 1, in which said first stage catalyst is a high silica zeolite supported on a high surface area alumina substrate and in which said transition metal is selected from the group consisting of copper, cobalt, nickel, chromium, iron, manganese, silver, zinc, calcium, and compatible mixtures thereof.

6. The system as in claim 1, in which said first stage catalyst is copper ion-exchange zeolite containing at least 3% by weight copper.

7. The system as in claim 1, in which said second stage catalyst contains palladium in a crystalline form having a crystal size in the range of 5-500 angstroms and the palladium/lanthanum ratio is in the range of 0.1-60.

* * * * *